United States Patent [19]

Seidel et al.

[11] Patent Number: 5,527,232
[45] Date of Patent: Jun. 18, 1996

[54] METHOD FOR CONTROLLING A CONTINUOUSLY VARIABLE TRANSMISSION OF A MOTOR VEHICLE

[75] Inventors: Willi Seidel, Eberdingen-Hochdorf; Joseph Petersmann, Wimsheim, both of Germany

[73] Assignee: Dr. Ing. h.c.F. Porsche AG, Weissach, Germany

[21] Appl. No.: 167,902

[22] PCT Filed: May 22, 1992

[86] PCT No.: PCT/EP92/01154

§ 371 Date: Jun. 21, 1994

§ 102(e) Date: Jun. 21, 1994

[87] PCT Pub. No.: WO93/00533

PCT Pub. Date: Jan. 7, 1993

[30] Foreign Application Priority Data

Jun. 21, 1991 [DE] Germany ............... 41 20 552.9

[51] Int. Cl.⁶ ............................................. B60K 41/12
[52] U.S. Cl. ..................... 477/46; 477/43; 477/905
[58] Field of Search ......................... 477/43, 48, 901, 477/904, 905, 46; 364/424.1

[56] References Cited

U.S. PATENT DOCUMENTS

| | | | |
|---|---|---|---|
| 4,589,302 | 5/1986 | Oda et al. ............... | 477/905 X |
| 4,612,827 | 9/1986 | Omitsu ............... | 477/43 |
| 4,782,934 | 11/1988 | Takano et al. ............... | 477/43 X |
| 4,817,469 | 4/1989 | Shigematsu et al. ............... | 477/43 |
| 4,831,898 | 5/1989 | Miyawaki ............... | 477/43 |
| 4,976,170 | 12/1990 | Hayashi et al. ............... | 477/905 X |
| 5,097,725 | 3/1992 | Sawa . | |
| 5,157,609 | 10/1992 | Stehle et al. ............... | 477/904 X |

FOREIGN PATENT DOCUMENTS

| | | |
|---|---|---|
| 0093312 | 9/1983 | European Pat. Off. . |
| 0207603 | 7/1987 | European Pat. Off. . |
| 0260117 | 3/1988 | European Pat. Off. . |

*Primary Examiner*—Rodney H. Bonck
*Assistant Examiner*—Peter Kwon
*Attorney, Agent, or Firm*—Evenson, McKeown, Edwards & Lenahan

[57] ABSTRACT

A method for controlling a preferably electrohydraulically actuated continuously variable transmission of a motor vehicle equipped with an internal combustion engine provides, in and ahead of curves, a retention of the last gear ratio set. The gear-ratio determination is initiated when the accelerator pedal is released rapidly in coasting operation. The gear transmission determination is suspended as soon as, after expiration of a time interval following recognition of acceleration, no curve is being traversed. If, during expiration of the time interval, coasting operation is detected again, the gear transmission determination is maintained for an additional time interval. Upon termination of the gear-ratio determination, a relatively slow adaptation of the gear ratio to the setting corresponding to the control curve RKLj takes place.

39 Claims, 6 Drawing Sheets

METHOD FOR CONTROLLING A CONTINUOUSLY VARIABLE TRANSMISSION OF A MOTOR VEHICLE

BACKGROUND AND SUMMARY OF THE INVENTION

The invention relates to a method according to the species of the main claim.

Ordinary automatic transmission controls of motor vehicles powered by internal combustion engines, as a rule initiate a reduction of the gear ratio when the accelerator pedal is released. When traveling on curves or when braking, however, this is not always desirable, since such a load change under certain conditions could lead to unsafe driving states, or, upon reacceleration of the motor vehicle by pressing on the accelerator pedal again, an increase in the gear ratio must be forced.

From DE 33 41 652 C2, in this connection and in connection with automatically shifted multi-step transmissions, it is known that this reduction of the gear ratio (upshifts) on curves can be avoided by determining the transverse acceleration of the motor vehicle. However, this only permits avoiding shifting on curves.

In order to be able to deliberately prevent reduction of the gear ratio when approaching curves, in the method for controlling an automatically shifting transmission according to DE 39 22 040 A1 the rate of change in the position of the accelerator pedal is recorded and, when a certain (negative) boundary value is undershot, a signal is derived to suppress an upshift process, provided coasting operation is recognized. Thereupon, upshifts are prevented until acceleration occurs again and a fixed time interval has elapsed.

It is also provided in DE 39 22 051 A1 to make this time interval dependent upon another parameter (driving activity), which is derived from one or a combination of several operating or driving parameters of a motor vehicle and evaluates a driving style of a driver or a prevailing traffic situation.

On the basis of this prior art, the goal of the invention is to provide a method for controlling a preferably electrohydraulically actuated continuously variable transmission for a motor vehicle that is further improved especially as regards the behavior of the adjustment of the gear ratio or the engine rpm before curves and when braking.

The goal is achieved according to the invention by the characterizing features of claim 1. Additional features that characterize the invention are contained in the subclaims.

The advantages of the invention lie primarily in the fact that a method for controlling a preferably electrohydraulically continuously variable transmission for a motor vehicle is provided, in which the adjusting behavior of the gear ratio, especially before curves and when braking, is further improved.

As soon as a state of a gear ratio determination is active, the gear ratio is set, or alternatively, either adjusted with a certain first relatively low speed or adjusted in such fashion that the engine rpm of a driving internal combustion engine changes with a predetermined rate (decreases). The state of the gear ratio determination becomes active when the driver of the motor vehicle, for example when approaching a curve, suddenly no longer presses down on the accelerator pedal and coasting operation is recognized. The state changes to the inactive state when, after acceleration is determined, a certain time interval has elapsed.

By virtue of an additional, renewed delay of changes in the gear ratio following recognition of acceleration followed by a new transition to coasting during a certain time interval, the driver of a motor vehicle, whose transmission is equipped with such a control, can briefly step on the accelerator even before curves without the undesired reduction of the gear ratio being performed. In this manner, improper estimates by the driver regarding approach to or travel around curves can be tolerated without negative effects on the overall driving behavior of the vehicle.

In another embodiment of the invention it is provided that after the end of the gear-ratio determination, a rapid adaptation of the gear ratio or of the engine rpm in the direction of a reduction is avoided over a large range, while the gear ratio or the engine rpm is adjusted at a certain second rate, whereby the latter is greater than the first rate but less than the maximum possible adjustment rate of the gear ratio of the continuously variable transmission.

Likewise, in braking, when certain noncritical conditions are present, an increase in gear ratio at a final third speed is automatically performed, whereby here again the adjustment rate is less than the maximum adjustment rate.

Maintenance of conditions ensures safe operation of the motor vehicle. Thus in particular monitoring ensures that the transverse acceleration is not too high, the vehicle is not decelerated too sharply, and the driving speed is not too high in order to prevent loss especially of the longitudinal and lateral guiding forces of the wheels of the motor vehicle. The braking moment, which acts increasingly on the driving wheels after an increase in gear ratio, of the driving (internal combustion) engine can therefore not have a negative effect on the driving behavior of the motor vehicle.

Increasing the gear ratio upon braking is preferably initiated when a state of gear-ratio determination is active. This is activated in known fashion when the motor vehicle approaches a curve and the driver no longer presses down on the accelerator pedal.

By increasing the gear ratio upon braking, firstly the braking effect of the driving engine of the motor vehicle is reinforced in coasting operation so that the brake (service brake) of the motor vehicle is relieved of its load. On the other hand, in conjunction with a determination of the gear ratio, provision is made, in and after curves, such that the driver, after passing through a curve, always has the optimum gear ratio or engine rpm available for reaccelerating the motor vehicle.

The invention will be explained below with reference to the embodiments shown in the drawings.

DETAILED DESCRIPTION OF THE DRAWINGS

Figure 1:
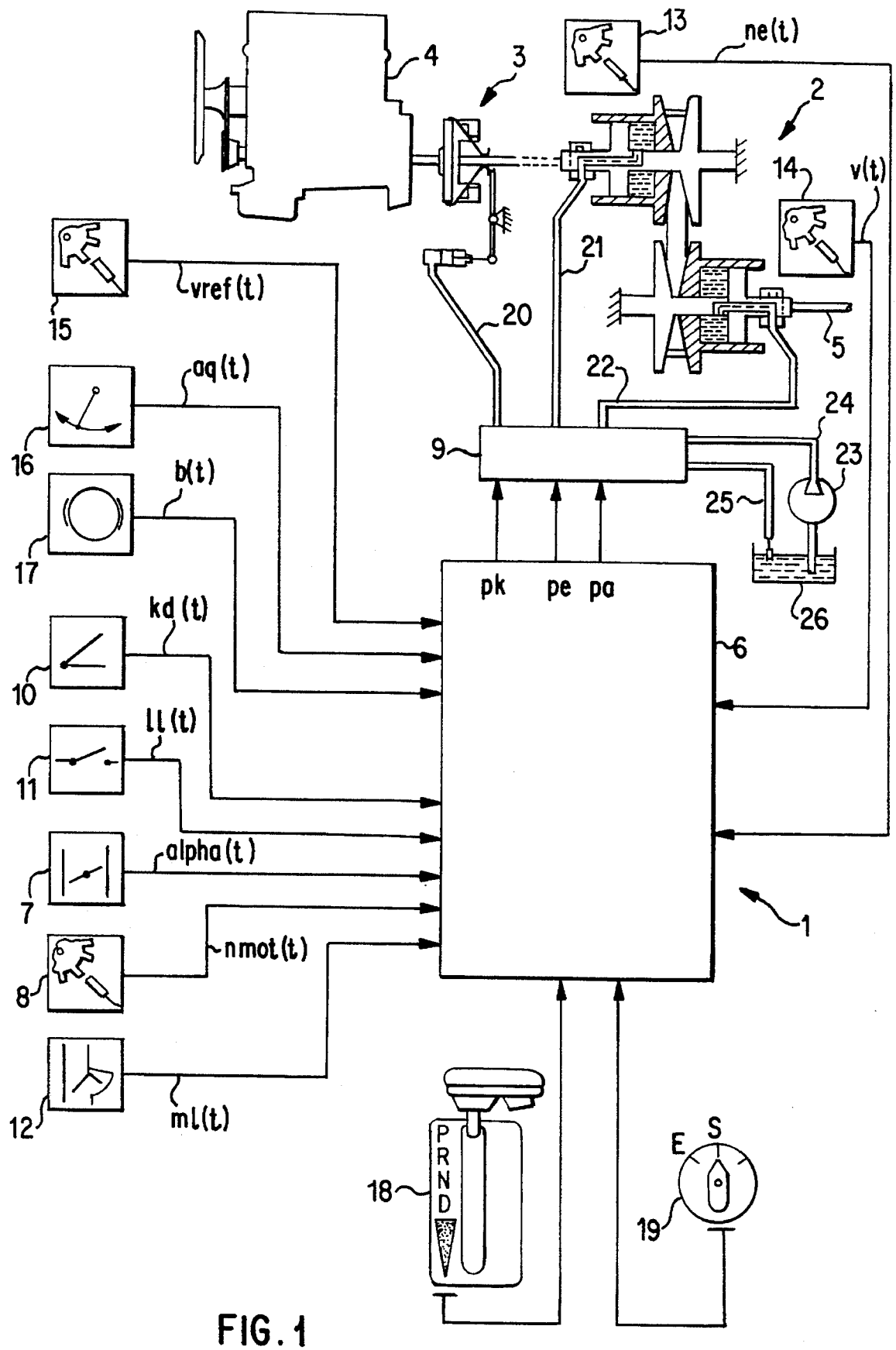
FIG. 1 is a block diagram of an electrohydraulic control for a continuously variable transmission of a motor vehicle.
Figure 2:
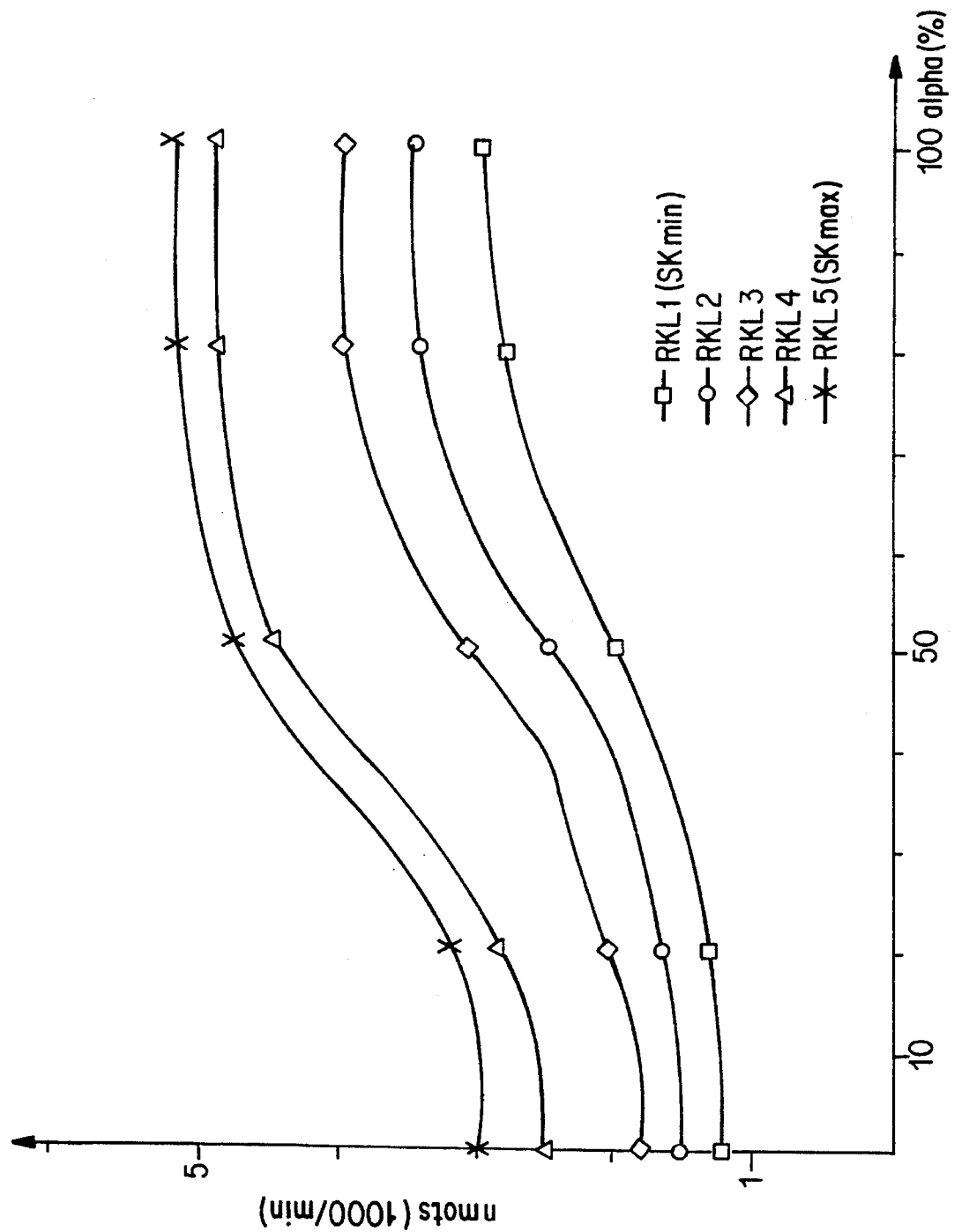
FIG. 2 is a family of several control curves which allocate certain values of the engine rpm setpoint to the values of the throttle angle.

FIG. 1 shows a control 1 of an electrohydraulically actuated continuously variable transmission 2 using the example of a friction transmission. Continuously variable transmission 2 is driven through a controllable engaging clutch 3 by an internal combustion engine 4. A driveshaft 5 of the continuously variable transmission 2 is connected with a wheel drive, not shown, of a motor vehicle.

In the following, signals that change with time t are shown as functions f(t) of time.

A control device 6 controls a hydraulic valve body 9, at least as a function of the (without limitation of generality) throttle position alpha(t) of a throttle angle sensor 7 and an engine rpm nmot(t) of an engine rpm sensor 8 of internal combustion engine 4. Of course, instead of the position of the throttle, the position of any element influencing the driving power of a driving engine of the motor vehicle, as for example an accelerator pedal or an injection pump lever of an autoignition diesel engine or the output signal of an electrical or electronic accelerator pedal, can be measured and processed.

To control continuously variable transmission 2 and engaging clutch 3, control device 6 receives, as additional input parameters or measured parameters, a kick-down signal kd(t) from a kick-down switch 10, an idle signal 11(t) from an idle switch 11, the air volume or air mass ml(t) fed to the internal combustion engine from an air volume or air mass sensor 12, as well as the transmission input rpm he(t) from a transmission input rpm sensor 13 and a driving speed v(t) from a driving speed sensor 14 of a motor vehicle. In addition, a speed vref(t) from a reference speed sensor 15 on a vehicle axle, not shown, a transverse acceleration aq(t) from a transverse acceleration sensor 16, and a braking signal b(t) from a braking signal sensor 17 are detected and processed by control device 6.

Finally, the control is usually influenceable by the vehicle driver by means of a selector lever 18 to preselect gears: P (park), R (reverse), N (neutral), and D (automatic adjustment of the gear ratio ue of the continuously variable transmission); in addition, an adjustment range of selector lever 18 for direct selection of the gear ratio ue is provided.

In ordinary transmission controls, the control curve according to which control device 1 in gear D controls the continuously variable transmission is selected by a program selector switch 19. As a rule, two control curves may be selected, whereby in the E position a consumption-optimized control curve RKL1, and in position S a performance-optimized control curve RKL5, can be set manually.

As already shown in DE 39 22 040 A1 and DE 39 22 051 A1, a curve recognition of this kind can occur whereby the change with time of the throttle position dalpha(t)/dt is sensed. As a rule, a driver eases off the accelerator pedal ahead of a curve, and as a rule the throttle as well, more rapidly than under normal circumstances in order to reduce the driving speed for example.

A reduction of the gear ratio ue, which is performed by normal transmission controls when the accelerator pedal is released or not actuated in a first version of the method according to the invention, is prevented, i.e. the momentary gear ratio is maintained, as long as the state of a gear-ratio determination usf is active, usf=1.

Alternatively, the gear ratio (ue) according to a second version of the method according to the invention is set at a first specified and final relatively slow speed (first time change in gear ratio ck1=due/dt=f(SK(t))) to at least that value of the gear ratio ue which is required to reach the engine rpm setpoint nmots(t) provided at the momentary operating point of the motor vehicle (alpha(t), v(t), nmot(t), t) on the momentarily set control curve RKLj, for at least as long as the state of a gear-ratio determination usf is active: usf=1.

As another alternative, according to a third version of the control method, the gear ratio (ue) is adjusted for at least as long as the state of a gear-ratio determination (usf) is active, in such a way that the engine rpm nmot remains constant or the engine rpm (nmot(t)) is reduced at a second specific finite and relatively slow speed (second change of engine rpm with time nk2=dnmot/dt=f(SK(t))), to the value of an engine rpm setpoint (nmots(t)) which is provided at the momentary operating point of the motor vehicle (alpha(t), v(t), nmot(t), t) on the momentarily set control curve (RKLj).

In all three versions, the state of the gear-ratio determination changes to the active state (usf=1) when a change as a function of time (dalpha(t)/dt) in the throttle position (alpha(t)) undershoots a negative basic value (−alphag) and coasting operation is detected; the state of the gear ratio determination (usf) following the expiration of a first time interval (T1(SK(t))) changes to the inactive state (usf=0) when acceleration is recognized.

The terms "acceleration" and "coasting" refer to the system in question. The following distinction is made:

Total motor vehicle system: in acceleration, the acceleration of the motor vehicle (change in driving speed with time) dv(t)/dt<0 is meant, while coasting corresponds to deceleration of the motor vehicle dv(t)/dt<0.

Clutch/transmission system: in acceleration, the input rpm of the clutch (torque converter)/transmission system is greater than its output rpm, while in coasting the input rpm is less than the output rpm.

Internal combustion engine system: acceleration means a throttle position alpha(t)>0 and a change in engine rpm with time dnmot(t)/dt>0, while in coasting the throttle position alpha(t)=0 or the change in engine rpm with time dnmot(t)/dt<0.

Figure 3:
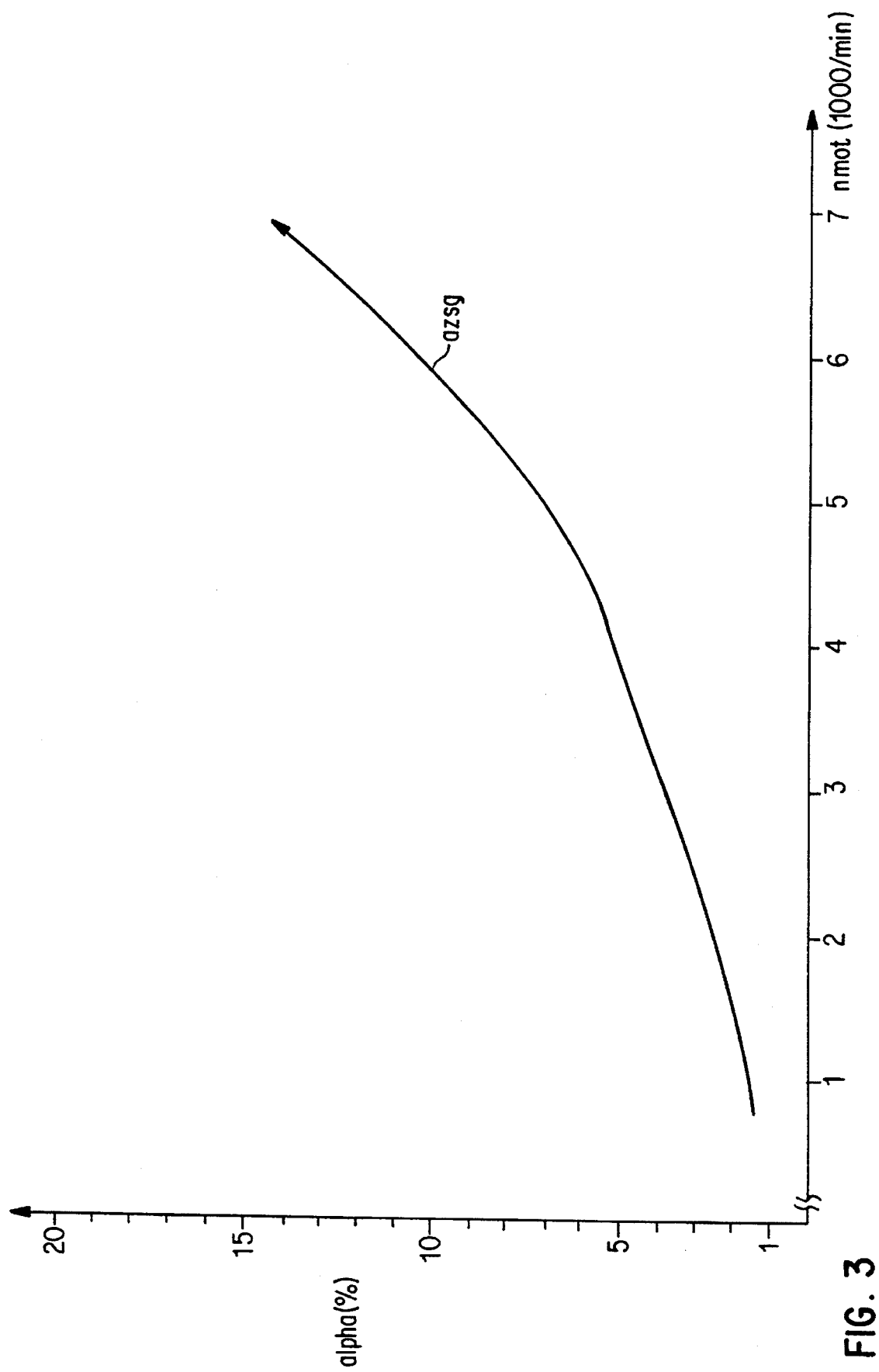
FIG. 3 is a boundary curve for recognizing acceleration/coasting operation.

With regard to transmission control and hence to the overall behavior of the motor vehicle, it has proven advisable to simulate the terms "acceleration" and "coasting" as follows:

Coasting operation is recognized when the throttle position alpha(t) drops below an engine rpm-dependent boundary curve azsg(nmot), as shown in FIG. 3: alpha(t)<azsg(nmot).

Acceleration is recognized when the throttle position alpha(t) exceeds the engine rpm-dependent boundary curve azsg(nmot) according to FIG. 3 and the change with time in driving speed dv(t)/dt assumes positive values: (alpha(t)>azsg(nmot)∩dr(t)/dt>0).

These terms for acceleration and coasting are referred to throughout the patent application.

According to the invention, the gear-ratio determination usf stays in the active state so long as, during the expiration of the first time interval T1(SK(t)), coasting operation is detected again; the gear ratio determination usf=1 remains active until acceleration is detected again and a second time interval T2(SK(t)) has elapsed.

In another embodiment of the invention, the reduction of the gear ratio ue of a continuously variable transmission which is initiated upon expiration of the first or second time interval (T1(SK(t)), T2(SK(t)) takes place at a third specific finite and relatively slow speed (change with time in gear ratio ck3=due/dt=f(SK(t)), whereupon the adjustment of the gear ratio ue takes place until a value is reached which is required to reach the engine rpm setpoint nmots(t) which is provided for the momentary operating point on the momentarily set control curve (RKLj).

The amount of the first speed ck1 is preferably smaller than the amount of the third speed ck3: |ck1|<|ck3|; the latter in turn should be smaller than the maximum adjustment speed of the gear ratio of the transmission.

According to the third variation on the control method, a decrease in the engine rpm nmot(t) which is initiated upon expiration of the first or second time interval T1(SK(t)), T2(SK(t)) takes place at a fourth specific finite and relatively slow speed (change with time in engine rpm nk4=dnmot/dt=f(SK(t))) to that value of engine rpm nmot which is provided for the momentary operating point on the momentarily set control curve RKLj.

The amount of the second speed nk2 is preferably smaller than the amount of the fourth speed nk4: |nk2|<|nk4|.

With an active gear-ratio determination usf=1, in addition, an increase in gear ratio ue takes place with a fifth specific finite speed (change with time in gear ratio cg5=due/dt=f(SK(t)) up to that value of the gear ratio ue which is maximally possible at the momentary operating point on the momentarily set control curve (without the internal combustion engine assuming inadmissible rotational speeds and thereby possibly being damaged).

Here, it is necessary to actuate a service brake of the motor vehicle: brake signal b=1, or, alternatively, or in addition, to have the change with time in driving speed dv(t)/dt less than a first negative longitudinal acceleration boundary value albg(ue, nmot, t), with albg(ue, nmot, t)<0: dv(t)/dt<albg(ue, nmot, t), and also for a transverse acceleration aq(t), determined by means of transverse acceleration sensor 17, to be beneath a certain first driving speed-dependent transverse acceleration boundary line aqg1(v(t)): aq(t)<aqg1(v(t), and also for the change with time in the driving speed dv(t))/dt to be less than a second negative longitudinal acceleration boundary value albbg(nmot, ue, SK(t), t)=k(ue, SK(t))*albg(ue, nmot, t): dv(t)/dt>albbg(nmot, ue, SK(t), t)=k(ue, SK(t))*albg(ue, nmot, t)

and also for the driving speed v(t) to be below a driving speed limiting value vg(ue, SK(t)): v(t)<vg(ue, SK(t)).

The increase in the gear ratio takes place up to that value of the gear ratio which, at the momentary operating point of the motor vehicle, is permissible on the momentarily active control curve RKLj(t).

Figure 4:
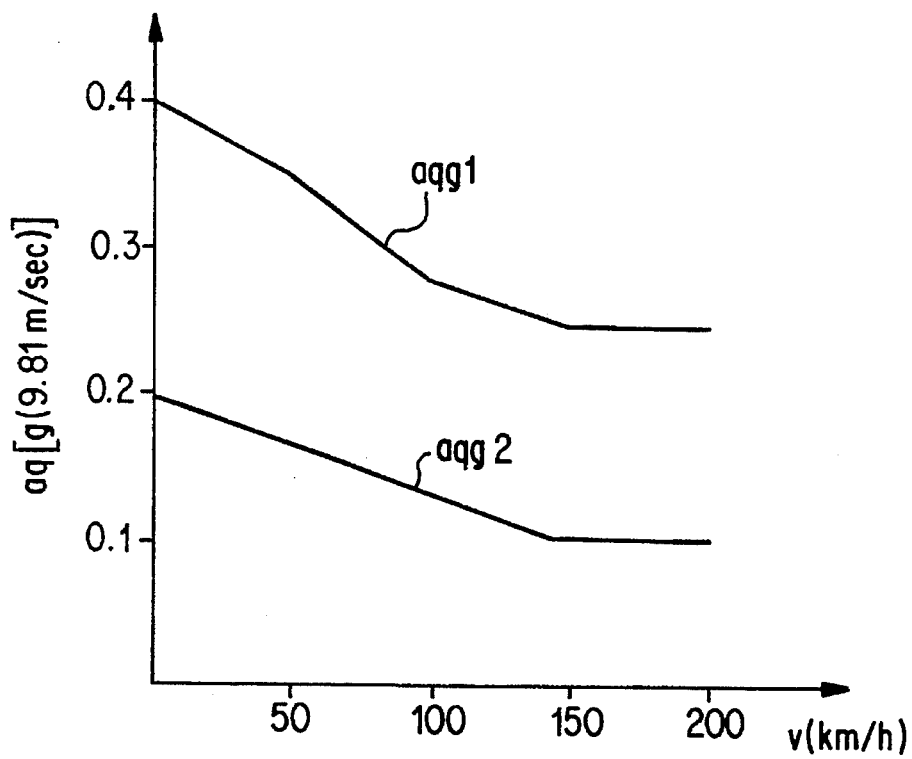
FIG. 4 is a first and a second driving speed-dependent boundary curve for a transverse acceleration.
Figure 7:
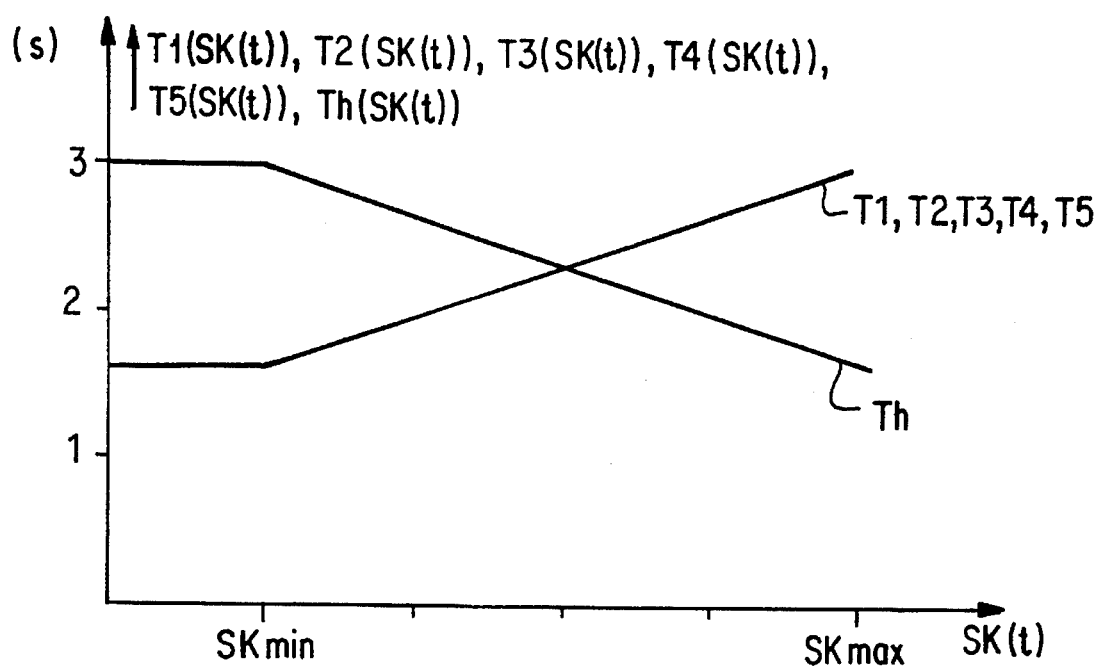
FIG. 7 is a curve that shows the dependence of time intervals upon driving activity.

The first transverse acceleration boundary line aqg1(v(t)) here is preferably dependent upon driving speed. A corresponding curve is shown in FIG. 4. It takes into account the fact that the gear ratio ue is increased only when the transverse acceleration of the motor vehicle is not too high.

The first negative longitudinal acceleration boundary value albg(ue, nmot, t) depends upon the momentary values of gear ratio ue and engine rpm nmot(t) and corresponds to the respective (negative) longitudinal acceleration dv/dt (and hence to the deceleration) of the motor vehicle, rolling in the defined state (load, tire pressure, environmental conditions, etc.) on a flat road, with the throttle closed alpha=0, at the respective value pairs of the momentarily set gear ratio ue and engine rpm nmot(t).

Figure 5:
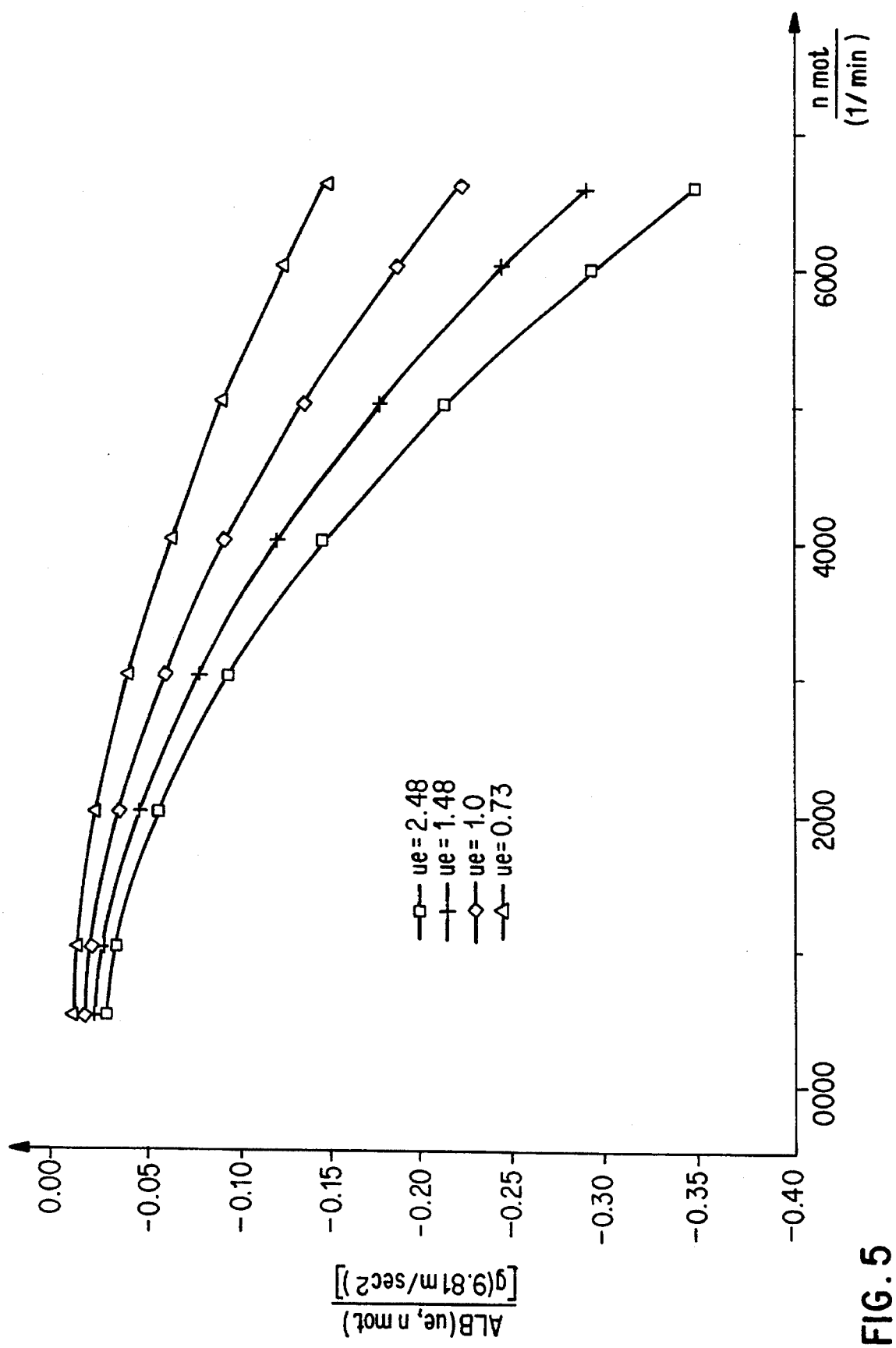
FIG. 5 is a characteristic diagram for a characteristic diagram value that depends upon engine rpm and gear ratio.

The first negative longitudinal acceleration boundary value albg(ue, nmot, t) is determined from the momentary values of these parameters preferably over a first characteristic diagram ALB(ue, nmot): albg(ue, nmot, t)=ALB(ue, nmot). An example of such a first characteristic field ALB(ue, nmot) is shown in FIG. 5. For example, four gear-ratio-dependent curves, which assign specific values of engine rpm nmot (in revolutions per minute) certain characteristic diagram values ALB(ue, nmot) in the g unit corresponding to 9, 81, . . . meters per second (acceleration due to gravity) are shown.

The values 2.48-1.48-1.0-0.73 are plotted as gear ratios. To determine the characteristic diagram values of the (vehicle-specific) characteristic diagram, which differ from the (gear ratio) curves shown, it is possible in known fashion either to interpolate or extrapolate as a function of the gear ratio. Alternatively, of course, determination of the longitudinal acceleration boundary values albg(g, nmot, t) can also be performed using a corresponding functional relationship.

The curves according to FIG. 5 clearly show the dependence of the deceleration values of a motor vehicle with an internal combustion engine upon the gear ratio ue and the engine rpm nmot(t). For increasing values of engine rpm nmot(t), the deceleration values increase by virtue of the increasing engine braking effect and the increasing rolling resistance (air resistance) of the motor vehicle. Likewise, the deceleration values increase with increasing gear ratio ue, since the braking moment of the internal combustion engine, because of the higher gear ratio, has a greater effect upon the deceleration rate of the motor vehicle.

The second negative longitudinal acceleration boundary value albbg(nmot, ue, SK(t))=k(ue, SK(t))*albg(ue,nmot, t) is determined according to a product of a gear-ratio-dependent factor k(ue, SK(t)) and a value determined during the momentary operating conditions of the motor vehicle for the first negative longitudinal acceleration boundary value albg(ue, nmot, t).

Figure 6:
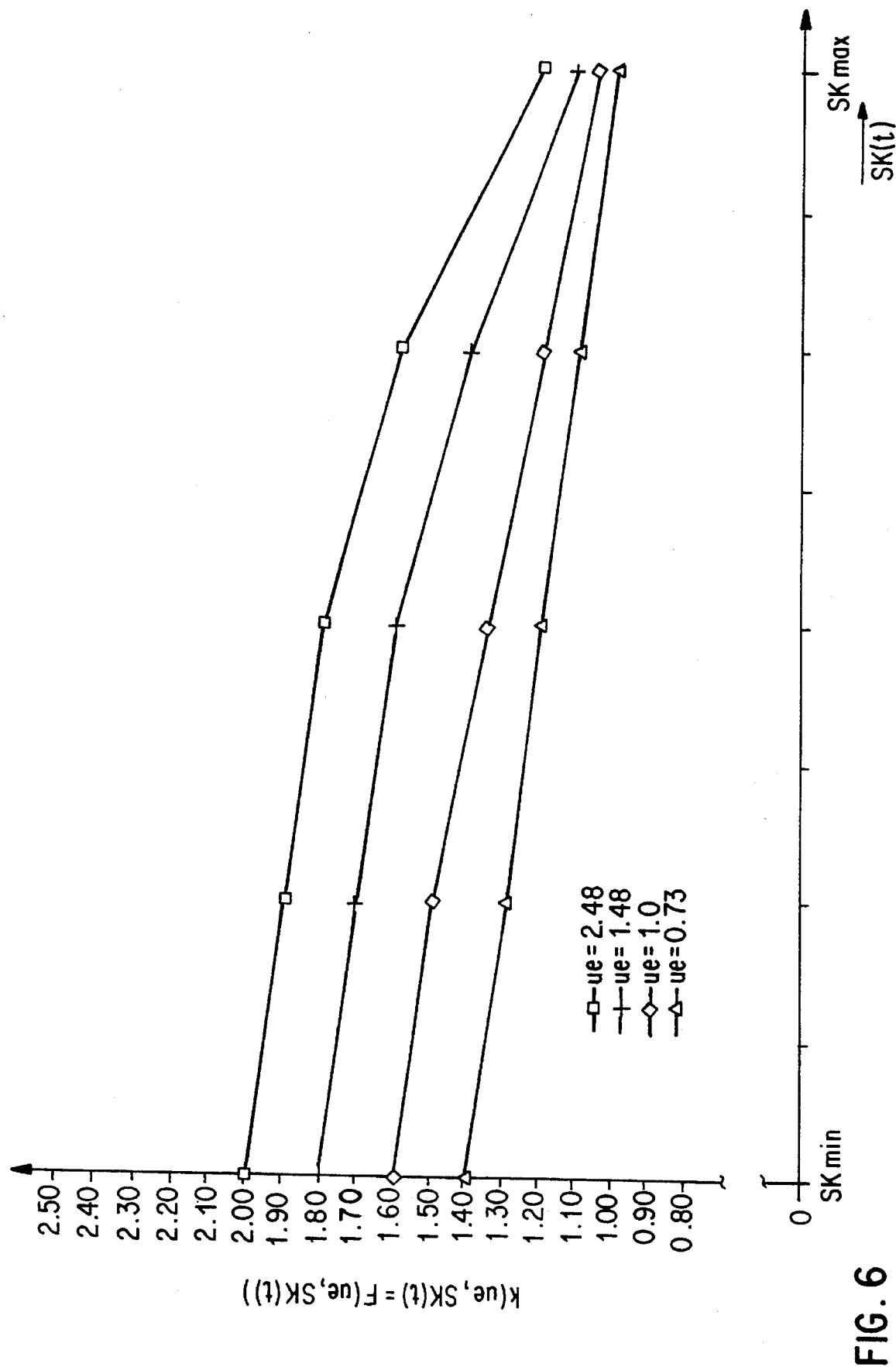
FIG. 6 is a characteristic diagram for a factor that depends upon the gear ratio and driving activity.

The gear-ratio-dependent factor k(ue, SK(t)) is determined with a second characteristic diagram k(ue, SK(t))=F(ue, SK(t)) from the momentary gear ratio ue. An example of the second characteristic diagram is shown in FIG. 6. Here again gear-ratio-dependent curves (gear ratio values 2.48-1.48-1.0-0.73) assign values of driving activity SK(t) to dimensionless values of factor k(ue, SK(t)); the characteristic diagram values valid for the gear ratio values that deviate from this can in turn be calculated by interpolation or extrapolation from the available values.

The driving speed boundary value vg(ue, SK(t), t) depends on the gear ratio ue and the driving activity SK(t).

The effect of the individual method steps is explained as follows:

by monitoring the actuation of the service brake of the motor vehicle (brake signal b=1) or alternatively or in addition thereto, by checking whether the change with time in the driving speed dv(t)/dt is below the first negative longitudinal acceleration boundary value albg(g, nmot) dv(t)/dt<albg(g, nmot), the driver's wish can be derived following increased deceleration of the motor vehicle or after a downshift.

By checking whether the transverse acceleration aq(t) is below the first determined transverse acceleration boundary line aqg1(v(t)), monitoring determines whether the vehicle is not already in a curve that is relatively tight or being traveled rapidly. If such curve travel already exists, downshifting is suppressed so that the contact between the wheel and the road is not lost as a result of the increasing braking action.

A comparable safety function is provided by monitoring the overshooting of the second negative longitudinal acceleration boundary value albg(nmot, g, SK(t)); this determines whether the higher deceleration of the motor vehicle which would be expected from the increase in the gear ratio ue would not lead to exceeding the limit of adhesive friction of the wheels.

Here, from the deceleration to be expected for the momentary driving state, by weighting (multiplication) times the gear-ratio-dependent factor k(ue, SK(t)), a momentary maximum permissible deceleration is determined and the latter is compared with the momentary vehicle deceleration dv(t)/dt; if the momentary deceleration is higher, an increase in the gear ratio is suppressed.

The gear-ratio-dependent factor k(ue, SK(t)) takes into account that the second negative longitudinal acceleration boundary value albbg(ue, nmot, t) is smaller than the first negative longitudinal acceleration boundary value albg(ue, nmot, t), and therefore must be larger in value (corresponding to a higher deceleration rate).

With the monitoring of the overshooting of the gear-ratio-dependent driving speed boundary value vg(ue, SK(t), t), additional safety criteria regarding an increase in gear ratio at an excessive driving speed or preventing exceeding rpm limits of the driving internal combustion engine following an increase in the gear ratio can be met. These safety criteria are highly vehicle specific and must therefore be adjusted individually for each vehicle, so that a corresponding characteristic diagram has been omitted.

In order, after approaching curves or braking ahead of curves, to prevent an undesired change in the gear ratio ue during rounding of the curve, the transverse acceleration of the vehicle is monitored. In a first alternative, the adjustment of the gear ratio ue is avoided or the time intervals T1(SK(t)) and T2(SK(t)) are set to 0, provided the amount of the transverse acceleration (|aq(t)|) exceeds a second and lower transverse acceleration boundary line that is dependent upon driving speed v(t), namely aqg2(v(t)) according to FIG. 4, or a third time interval T3(SK(t)) has not yet elapsed following undershooting of the second transverse acceleration boundary line aqg2(v(t)).

In a second alternative, the gear ratio (ue) is set at a sixth certain finite and relatively slow speed (sixth change with time in gear ratio ck6=due/dt=f(SK(t))) at that value of the gear ratio (ue) which is required to reach the engine rpm setpoint nmots(t) provided at the momentary operating point of the motor vehicle (alpha(t), v(t), nmot(t), t) on the momentarily set control curve RKLj, until the amount of the transverse acceleration |aq(t)| exceeds the second transverse acceleration boundary line aqg2(v(t)) in FIG. 4 or until, after undershooting the second transverse acceleration boundary line aqg2(v(t)), a fourth time interval T4(SK(t)) has not yet elapsed.

The reduction of gear ratio (ue) which is initiated following expiration of the third time interval T3(SK(t)) or fourth time interval T4(SK(t)) takes place at a seventh specified and finite relatively slow speed (seventh change with time in gear ratio ck7=due/dt=f)SK(t))) up to that value of the gear ratio which is required in order to achieve the engine rpm setpoint nmots(t) provided at the momentary operating point on the momentarily set control curve RKLj(t).

The amount of the sixth speed (sixth change with time in gear ratio ck6=due/dt) is smaller here than the amount of the seventh speed (seventh change with time in gear ratio ck7=due/dt): |ck6|<|ck7|.

The amount |ck7| of the seventh speed (seventh change with time and gear ratio ck7) is preferably less than the maximum possible adjustment speed of the gear ratio of the transmission.

By virtue of the control according to the second alternative the gear ratio of the transmission is reduced relatively slowly during travel on the curve, so that the engine rpm remains relatively constant and hence in the range desired by the driver (for example in the range of highest torque). If, after completing travel on the curve, no transition to acceleration takes place or time interval T4(SK(t)) elapses, the engine rpm nmot(t), by suitable adjustment of the gear ratio of the transmission, is brought relatively rapidly to that needed to reach the engine rpm setpoint nmots(t).

In a third alternative, as long as amount |aq(t)| of transverse acceleration aq(t) exceeds the second transverse acceleration boundary line aqg2(v(t)) according to FIG. 4, or as long as, after undershooting of the second transverse acceleration boundary line aqg2(v(t)) the fourth time interval has not yet been undershot, the gear ratio ue of the transmission is adjusted so that the engine rpm nmot(t) is kept constant, or the engine rpm nmot(t) is reduced at an eighth specified speed nk8(SK(t)) (eighth change with time nk8=dnmot/dt=f(SK(t)).

The gear ratio ue is kept constant during or after travel on the curve, as soon as the engine rpm nmot(t) has reached that value of the engine rpm setpoint nmots(t) which, at the momentary operating point of the motor vehicle, is provided on the momentarily set control curve RKLj.

In addition, an adjustment of the gear ratio ue is avoided and/or the time intervals T1(SK(t)), T2(SK(t)), T3(SK(t)), T4(SK(t)) are set to 0, provided the amount of transverse acceleration |aq(t)| exceeds a first transverse acceleration boundary line aqg1=f(v(t)) that depends upon driving speed v(t), or so long as after undershooting the first transverse acceleration boundary line aqg1=f(v(t)), a fifth time interval T5(SK(t)) has not yet elapsed. In this way, gear ratio adjustments when traveling on extreme curves can be avoided.

In addition, a change in the gear ratio ue, but especially an increase in the gear ratio, is avoided and/or time intervals T1(SK(t)), T2(SK(t)), T3(SK(t)), T4(SK(t)) and T5(SK(t)) are set to 0, provided that excessive wheel slip appears at at least one of the wheels of the motor vehicle or the connection between at least one wheel of the motor vehicle and the road being traveled is interrupted.

In this context an adjustment of the gear ratio, but especially in the sense of an increase, is only permitted when a differential speed Dv(t)=vref(t)−v(t) between a speed vref(t) of a nonpowered axle and the driving speed v(t) determined on a powered axle does not exceed a permissible differential speed value Dvzul(SK(t)): Dv(t)<Dvzul(SK(t)).

Likewise, in order to reduce excessive wheel slip when the permissible differential speed value Dvzul is exceeded,

- a converter bridging clutch of a transmission equipped with a torque converter is freed,
- a holding time Th(SK(t)) is set, during which an increase in the gear ratio ue cannot be suppressed,
- the set gear ratio ue is reduced to a permissible value, at least, and
- an increase in gear ratio ue is prevented, with these functions being reset once more when acceleration is detected and positive values for the change in driving speed v(t) are available.

Time intervals T1(SK(t)), T2(SK(t))), T3(SK(t)), T4(SK(t)), T5(SK(t)) and Th(SK(t)) can be of the same or of different durations. Likewise, at least one of the time intervals T1(SK(t)), T2(SK(t)), T3(SK(t)), T4(SK(t)), Th(SK(t)), or at least one of the driving speed limiting values vg(ue, SK(t), t) or one of the gear-ratio-dependent factors k(ue, SK(t)) or at least the first, second, third, fourth, fifth, sixth, seventh, or eighth speed ck1, nk2, ck3, nk4, cg5, ck6, ck7, nk8 is arbitrarily adjustable to increase or decrease the gear ratio ue(t) or the engine rpm nmot(t) or the admissible differential speed value Dvzul(SK(t)) arbitrarily adjustably and are adjusted preferably together with an adjustment of the control curves RKLj (consumption-optimized driving program, control curve RKL1; performance-optimized driving program, control curve RKL5) in such fashion that with more performance-optimized driving programs (control curve RKL5), the time intervals T1(SK(t)), T2(SK(t)), T3(SK(t)), T4(SK(t)), T5(SK(t)) the fifth speed ck5, and the boundary value vg(g, SK(t), t) increase and the holding time Th(SK(t)), the speeds ck1, nk2, ck3, nk4, ck6, ck7, and nk8, the gear-dependent factor k(g−1, SK(t)), and the permissible differential speed value Dvzul(SK(t)) become smaller.

On the other hand, if the transmission control provides an automatic adjustment of the control curves (RKLj) corresponding to the driving activity (SK(t)) which in the long term evaluates the driving style of the driver or his behavior as a function of traffic situations relative to the control of the motor vehicle, at least one of the time intervals T1(SK(t)), T2(SK(t))), T3(SK(t)), T4(SK(t)), T5(SK(t)), Th(SK(t)) or at least the driving speed boundary value of vg(ue, Sk(t), t) or one of the gear-ratio-dependent factors k(ue, SK(t)) or at least the first, second, third, fourth, fifth, sixth, seventh or eighth speed ck1, k2, ck3, nk4, cg5, ck6, ck7, nk8 to reduce or increase the gear ratio us(t) or the engine rpm nmot(t) or the permissible differential speed value Dvzul(SK(t)) depends upon the driving activity SK(t). With increasing, more performance-oriented driving activity SK(t), preferably the time intervals T1(SK(t)), T2(SK(t))), T3(SK(t)), T4(SK(t)), T5(SK(t)), the fifth speed cg5, and the boundary value vg(g, SK(t), t) become larger and the holding time Th(SK(t)), the speeds ck1, nk2, ck3, nk4, ck6, ck7, and nk8, the gear-dependent factor k(g−1, SK(t)), and the permissible differential speed value Dvzul(SK(t)) become smaller.

What is claimed is:

1. Method of controlling an electrohydraulically actuated continuously variable transmission (2) of a motor vehicle driven by an internal combustion engine (4), whose internal combustion engine (4) is influenceable by a power control element, including one of an accelerator pedal and a throttle, with the gear ratio (ue) of transmission (2) being adjusted automatically indirectly by means of at least one control curve (RKLj) at least as a function of the throttle position (alpha(t)) and the engine rpm (nmot(t)), wherein the gear ratio (ue) of the transmission is maintained constant as long as the state of a gear-ratio-determination (usf) is active (usf=1), with the state of the gear-ratio determination (usf) changing to the active state (usf=1) when a change over time (dalpha(t)/dt) in the throttle position (alpha(t)) undershoots a negative boundary value (−alphag) and coasting operation is recognized, and wherein the state of the gear-ratio determination (usf) after the expiration of a first time interval (T1(SK(t))) changes to the inactive state (usf−0) when acceleration is detected.

2. Method for controlling an electrohydraulically actuated continuously variable transmission (2) of a motor vehicle driven by an internal combustion engine (4), whose internal combustion engine (4) is influenceable by means of a performance-control element, including one of an accelerator pedal and a throttle, with the gear ratio (ue) of transmission (2) being adjusted automatically indirectly by means of at least one control curve (RKLj) at least as a function of the throttle position (alpha(t)) and the engine rpm (nmot(t)), wherein the gear ratio (ue) is adjusted at a first specific finite and relatively slow speed (first change with time in gear ratio ck1=due/dt=f(SK(t))) up to that value of the gear ratio (ue) which is required to reach the engine rpm setpoint (nmots(t)) provided at the momentary operating point of the motor vehicle (alpha(t), v(t), nmot(t), t) on the momentarily selected control curve (RKLj), for as long as the state of a gear-ratio determination (usf) is active (usf=1), with the state of the gear-ratio determination changing to the active state (usf=1) when a change with time (dalpha(t)/dt) of the throttle position (alpha(t)) exceeds a negative boundary value (−alphag) and coasting operation is detected, and wherein the state of the gear-ratio determination (usf), following expiration of a first time interval (T1(SK(t))), changes to the inactive state (usf=0) when acceleration is detected.

3. Method of controlling an electrohydraulically actuated continuously variable transmission (2) of a motor vehicle powered by an internal combustion engine (4), whose internal combustion engine (4) is influenceable by means of a performance control element including one of an accelerator pedal and a throttle, with the gear ratio (ue) of transmission (2) being adjusted automatically indirectly by means of at least one control curve (RKLj) at least as a function of the throttle position (alpha(t)) and the engine rpm (nmot(t)), wherein the gear ratio (ue) is adjusted at least as long as the state of gear-ratio determination (usf) is active, in such fashion that the engine rpm (nmot(t)), at a second specific finite and relatively slow speed (second change with time and engine rpm nk2=dnmot/dt=f(SK(t))) is reduced to that value of an engine rpm setpoint (nmots(t)) which is provided at the momentary operating point of the motor vehicle (alpha(t), v(t), nmot(t), t) on the momentarily chosen control curve (RKLj), wherein the state of the gear-ratio determination changes to the active state (usf=1) when a change as a function of time (dalpha(t)/dt) of the throttle position (alpha(t)) undershoots a negative boundary value (alphag) and coasting operation is detected, and wherein the state of the gear-ratio determination (usf) changes, after expiration of a first time interval (T1(SR(t))) to the inactive state (usf=0) when acceleration is detected.

4. Method according to claim 3 wherein in the event that coasting operation is detected again during the expiration of the first time interval, the gear-ratio determination stays in the active state (usf=1) until acceleration is detected once more and a second time interval (T2(SK(t)) has elapsed once more.

5. Method according to claim 4 wherein coasting operation is detected when the throttle position (alpha(t)) drops below an engine rpm-dependent boundary curve (azsg(nmot)) (alphas(t)<azsg(nmot)).

6. Method according to claim 4 wherein acceleration is detected when the throttle position (alpha(t)) exceeds the engine rpm dependent curve azsg (nmot) (alpha(t)>azsg(nmot) and the change with time in driving speed (dv(t)/dt) assumes positive values (alpha(t)>azsg(nmot) dv(t)/dt>0).

7. Method according to claim 6 wherein a reduction of the gear ratio (ue) which is initiated upon expiration of one of a first and second time interval (T1(SK(t)), T2(SK(t))) takes place at a third specific finite and relatively slow speed (change with time in gear ratio ck3=due/dt=f(SR(t))) to that value of the gear ratio (ue) which is required to reach the engine rpm setpoint (nmots(t)) provided at the momentary operating point of the motor vehicle on the momentarily set control curve (RKLj).

8. Method according to claim 7 wherein the amount of the first speed (change with time in gear ratio ck1=due/dt) is smaller than the amount of the third speed (change with time in gear ratio ck3=due/dt) (ck1 ck3).

9. Method according to claim 8 wherein the amount of the third speed (amount of the change with time in gear ratio (ck3=due/dt) is less than the maximum possible adjustment speed of the gear ratio of the transmission.

10. Method according to claim 6 wherein a drop in the engine rpm (nmot(t)), initiated with the expiration of one of a first and second time interval (T1(SK(t)), (T2(SK(t))), takes place at a fourth specific finite and relatively slow speed (change with time in engine rpm nk4=dnmot/dt= f(SK(t))) to that value of the engine rpm setpoint (nmots) which is provided at the momentary operating point on the momentarily set control curve (RKLj).

11. Method according to claim 10 wherein the amount of the second speed (change with time in engine rpm nk2= dnmot/dt) is less than the amount of the fourth speed (change with time in engine rpm nk4=dnmot/dt) (Ink21<nk4).

12. Method according to claim 11 wherein the gear ratio (ue) is kept constant as soon as the engine rpm (nmnt(t)) reaches the engine rpm setpoint (nmots(t)).

13. Method according to claim 12 wherein during active gear ratio determination (usf=1), an increase in gear ratio (ue) takes place at a fifth specific finite and relatively slow speed (fifth change with time in s2ar ratio cgS=due/dt= f(SK(t)) when at least one of a service brake on the motor vehicle is actuated (brake signal b=1) and the change in time in driving speed (dv(t)/dt) is smaller than a first negative longitudinal acceleration boundary value (albg(ue, nmot, t), albg(ue, nmot, t)<0) (dv(t)/dt<albg(ue, nmot, t)), and also a transverse acceleration (aq(t)) detected by means of a transverse acceleration sensor (16) is below a first specific transverse acceleration boundary line (aqg1(v(t)) (aq(t)<aqg1(v(t)), and also the change with time in driving speed (dv(t)/dt) is greater than a second negative longitudinal acceleration boundary value (albbg(nmot, ue, SK(t), t)=k(ue, SK(t))*albg(ue, nmot, t)<0) (dr(t)/dt>albbg(nmot, ue, SK(t), t)=k(ue, SK(t))*albg(ue, nmot, t)), and also the driving speed (v(t)) is below a driving speed limiting value (vg(ue, SK(t))) (v(t)<vg(ue, SK(t))).

14. Method according to claim 13 wherein the increase in gear ratio (ue(t)) takes place up to that value of the gear ratio (ue) which is permissible at the momentary operating point on the momentarily set control curve.

15. Method according to claim 14 wherein the first transverse acceleration boundary line (aqg1(v(t)) depending on the driving speed (v(t)) of the motor vehicle.

16. Method according to claim 15 wherein the fact that the first negative longitudinal acceleration boundary value (albg(ue, nmot, t)) depends on the momentary values of the set gear ratio (ue) and the engine rpm (nmot(t)) and the longitudinal acceleration (dv~dt; deceleration) of the motor vehicle rolling in the defined state on a flat road, with the throttle closed (alpha=0) corresponds to the respective value pairs of the momentarily set gear ratio (ue) and the engine rpm (nmot).

17. Method according to claim 16 wherein the first negative longitudinal acceleration boundary value (albg(ue, nmot, t)) is determined by means of a first characteristic diagram (ALB(ue, nmot)) from the momentary values of the gear ratio (ue(t)) and the engine rpm tnmot(t)) (albg(ue, nmot, t)=ALB(ue, nmot)).

18. Method according to claim 17 wherein the second negative longitudinal acceleration boundary value (albbg(nmot, ue, SK(t), t)=k(ue, SK(t))*albg(ue, nmot, t)) is determined according to a product of a gear-ratio-dependent factor (k(ue,SK(t)) and the momentary value of the first negative longitudinal acceleration boundary value (albg(ue, nmot, t).

19. Method according to claim 18 wherein the gear-ratio-dependent factor (k(ue, SK(t))) is determined by means of a second characteristic diagram (k(ue, SK(t))=F(ue, SK(t))) from the momentary gear ratio (ue).

20. Method according to claim 19 wherein the driving speed boundary value (vg(ue, Sk(t), t)) depends upon at least the momentarily set gear ratio (ue).

21. Method according to claim 20 wherein the gear ratio (ue) is maintained for at least as long as the amount of transverse acceleration (aq(t)) exceeds a second transverse acceleration boundary line (aqg2(v(t))).

22. Method according to claim 20 wherein the gear ratio (ue) is set at a sixth specific finite and relatively slow speed (sixth change with time in gear ratio ck6=due/dt=f(SK(t))) to that value of the gear ratio (ue) which is required to reach the engine rpm setpoint (nmots(t)) provided at the momentary operating point of the motor vehicle (alpha(t), v(t), nmot(t), t) on the momentarily set control curve (RKLj) for at least as long as the amount of transverse acceleration (aq(t)) exceeds the second transverse acceleration boundary line (aqg2(v(t))).

23. Method according to claim 22 wherein the reduction of gear ratio (ue) which is initiated following expiration of one of the third time interval (T4(SK(t))) and the fourth time interval (T4(SK(t))) takes place at a seventh specific finite and relatively slow speed (seventh change with time in gear ratio ck7=due/dt=f(SK(t))) to that value of the gear ratio (ue) which is required to reach the engine rpm setpoint (nmots(t)) provided at the momentary operating point on the momentarily set control curve (RKLj).

24. Method according to claim 23 wherein the amount of the sixth speed (change with time in gear ratio of ck6=due/dt) is smaller than the amount of the seventh speed (change with t me in gear ratio ck7=due/dt) (ck6 Ck7l).

25. Method according to claim 24 wherein the amount of the seventh speed (ck7) (amount of the change with time in gear ratio (ck7=due/dt) is smaller than the maximum possible adjustment speed of the gear ratio of the transmission.

26. Method according to claim 20 wherein as long as the amount (aq(t)) of transverse acceleration (aq(t)) exceeds the second transverse acceleration boundary line (aqg2(v)), the gear ratio (ue) of the transmission is adjusted in such fashion that the engine rpm (nmot(t)) is kept constant or the engine rpm (nmot(t)) is reduced with an eighth specific speed (nk8(SK(t))) (eighth change with time nk8=dnmot/dt= f(SK(t)) of engine rpm nmot(t)).

27. Method according to claim 26 wherein the gear ratio (ue) is kept constant as soon as the engine rpm (nmot(t)) has reached that value of the engine rpm setpoint (nmots(t)) which is provided at the momentary operating point of the motor vehicle on the momentarily set control curve (RKLj).

28. Method according to claim 27 wherein at least one of an adjustment of the gear ratio (ue) is avoided and the time intervals (T1(SK(t)), T2(SK(t)), T3(SK(t)), T4(SK(t))) are set to 0, provided the amount of transverse acceleration (aq(t)) exceeds the first transverse acceleration boundary line (aqg1=f(v(t))) that depends upon the driving speed (v(t)).

29. Method according to claim 28 wherein at least one of an increase in the gear ratio is avoided and the time intervals (T1(SK(t)), T2(SK(t)), T3(SK(t)), T4(SK(t)), T5(SK(t))) are set to 0, provided excessive wheel slip occurs at at least one of the wheels of the motor vehicle.

30. Method according to claim 28 wherein an increase in gear ratio is only permitted when a differential speed (Dv(t)= vref(t)−v(t)) between a speed (vref(t)) of a nonpowered axle and the driving speed (v(t)) detected on a powered axle does not exceed a permissible differential speed value (Dvzul(SK(t))) (Dv(t)<Dvzul(SK(t))).

31. Method according to claim 30 wherein upon exceeding the permissible differential speed value (Dvzul)

a converter bridging clutch of a transmission equipped with a torque converter is freed, a holding time (Th(SK(t)) is set, during which an increase of gear ratio (ue) cannot be suppressed, the set gear ratio (ue) is reduced at least to a permissible value, and an increase in gear ratio (ue) is prevented, whereby these functions are reset when acceleration is detected and positive values for the change with time of driving speed (dv(t)/dt) are available.

32. Method according to claim 21 wherein at least one of: the time intervals (T1(SK(t)), T2(SK(t)), T3(SK(t)), T4(SK(t), T5(SK(t)); the driving speed boundary value (vg(ue, Sk(t), t); the gear-ratio-dependent factor (k(ue, SK(t))); and at least the first, second, third, fourth, fifth, seventh, and eighth speed (ck1, nk2, ck3, nk4, cg5, ck6, ck7, ni8) is deliberately adjustable to vary one of the gear ratio (ue(t)) and the engine rpm (nmot(t)) or the permissible differential speed value (Dvzul(SK(t))), and together with an adjustment of control curves (RKLj) (consumption-optimized driving program, control curve RKL1; performance-optimized driving program, control curve RKL5) are adjusted in such a way that for the more performance-optimized driving programs (control curve RKL5) the time intervals (T1(SK(t)), T2(SK(t))), T3(SK(t)), T4(SK(t)), T5(SK(t))), the fifth speed (cg5) and the boundary value (vg(g, SK(t), t)) become larger and the holding time (Th(SK(t))), the speeds (ck1, nk2, ck3, nk4, ck6, ck7, and nk8), the gear-dependent factor (k(g−1, SK(t))) and the permissible differential speed value (Dvzul(SK(t))) become smaller.

33. Method according to claim 32 wherein at least one of: the time intervals (T1(SK(t)), T2(SK(t)), T3(SK(t)), T4(SK(t), T5(SK(t)), (Th(SR(t))); the driving speed boundary value (vg(ue, Sk(t), t); the gear-ratio-dependent factor (k(ue, SK(t))); the first, second, third, fourth, fifth, sixth, seventh, or eighth speed (ck1, nk2, c~3, nk4, cg5, ck6, ck7, nk8) to vary one of the gear ratio (ue(t)), the engine rpm (nmot(t)); and the permissible differential speed value (dvzul(SK(t))), are dependent upon the driving activity (SK(t)) evaluating in the long term the driving style of the driver or his behavior in traffic situations relative to the control of the motor vehicle, and with increasing, more performance-oriented driving activity (SK(t)) the time intervals (T1(SR(t)), T2(SK(t))), T3(SK(t)), T4(SK(t)), T5(SK(t))), the fifth speed (cg5) and the boundary value (vg(g, SK(t), t)) become greater and the holding time (Th(SK(t))), the speeds (ck1, nk2, ck3, nk4, ck6, ck7, and nk8), the gear-dependent factor (k(g−1, SK(t))) and the permissible differential speed value (Dvzul(SK(t))) become smaller.

34. Method according to claim 33 wherein the driving activity (SK(t)) is determined by means of a relationship evaluating one of the driving style of the driver and his behavior as a function of traffic situations relative to the control of the motor vehicle in the long term (sliding averaging) from current and past values of one of a single operating parameter and of a single value that is assembled from several operating parameters of a motor vehicle.

35. Method according to claim 20 wherein the gear ratio (ue) is maintained for so long as, after undershooting the second transverse acceleration boundary line (aqg2(v(t))), a third time interval (T3(SK(5))) has not yet elapsed.

36. Method according to claim 20 wherein the gear ratio (ue) is set at a sixth specific finite and relatively slow speed (sixth change with time in gear ratio ck6=due/dt=f(SK(t))) to that value of the gear ratio (ue) which is required to reach the engine rpm setpoint (nmots(t)) provided at the momentary operating point of the motor vehicle (alpha(t), v(t), nmot(t), t) on the momentarily set control curve (RKLj) for so long as, after undershooting the second transverse acceleration boundary line (agg2(v(t))), a fourth time interval (T4(SK(t))) has not yet elapsed.

37. Method according to claim 20 wherein for as long after undershooting the second transverse acceleration boundary line (aqg2(v(t)3 as the fourth time interval has not yet be undershot, the gear ratio (ue) of the transmission is adjusted in such fashion that the engine rpm (nmot(t)) is kept constant or the engine rpm (nmot(t)) is reduced with an eighth specific speed (nk8(SK(t))) (eighth change with time nk8=dnmot/dt=f(SK(t)) of engine rpm nmot(t)).

38. Method according to claim 27 wherein at least one of an adjustment of the gear ratio (ue) is avoided and the time intervals (T1(SK(t)), T2(SK(t)), T3(SK(t)), T4(SK(t))) are set to 0, for so long as, after undershooting the first transverse acceleration boundary line (aqg1=f(v(t))), a fifth time interval (T5(SK(t))) has not yet elapsed.

39. Method according to claim 28 wherein at least one of an increase in the gear ratio is avoided and the time intervals (T1(SK(t)), T2(SK(t)), T3(SK(t)), T4(SK(t)), T5(SK(t))) are set to 0, provided contact between at least one wheel of the motor vehicle and the road being traveled is interrupted.

* * * * *